US012752249B2

(12) United States Patent
Dong et al.

(10) Patent No.: US 12,752,249 B2
(45) Date of Patent: Oct. 6, 2026

(54) PREPARATION METHOD OF HIGH-EFFICIENCY GEL FOR SEAWATER DESALINATION

(71) Applicant: Shanghai Maritime University, Shanghai (CN)

(72) Inventors: Yaohua Dong, Shanghai (CN); Lihua Dong, Shanghai (CN); Lin Ren, Shanghai (CN)

(73) Assignee: Shanghai Maritime University, Shanghai (CN)

( * ) Notice: Subject to any disclaimer, the term of this patent is extended or adjusted under 35 U.S.C. 154(b) by 555 days.

(21) Appl. No.: 18/457,563

(22) Filed: Aug. 29, 2023

(65) Prior Publication Data

US 2024/0165574 A1 May 23, 2024

(51) Int. Cl.

| | |
|---|---|
| ***C02F 1/14*** | (2023.01) |
| ***B01J 13/00*** | (2006.01) |
| *C02F 103/08* | (2006.01) |

(52) U.S. Cl.

CPC ....... *B01J 13/0091* (2013.01); *B01J 13/0065* (2013.01); *C02F 1/14* (2013.01); *C02F 2103/08* (2013.01)

(58) Field of Classification Search

CPC ...... B01J 13/0091; B01J 13/0065; C02F 1/14; C02F 2103/08

See application file for complete search history.

(56) References Cited

FOREIGN PATENT DOCUMENTS

| | | | | | |
|---|---|---|---|---|---|
| CN | 107057326 | A | | 8/2017 | |
| CN | 111068627 | A | | 4/2020 | |
| CN | 112442193 | A | * | 3/2021 | ............. C08J 3/075 |
| CN | 113512208 | A | | 10/2021 | |
| CN | 114933716 | A | | 8/2022 | |
| DE | 102015107233 | A1 | | 11/2016 | |
| RU | 2220987 | C2 | | 1/2004 | |

OTHER PUBLICATIONS

"Effect of Freezing Dehydration Method and Pressing Dehydration Method on the Strength of Agar Gel", written by Laihao Li, Peiji Chen, Daogong Wang, Yanyan Wu, dated Mar. 5, 1995.

Search Report, issued in CN202211436402.7 (priority application), by CNIPA, dated Nov. 16, 2022.

* cited by examiner

*Primary Examiner* — Jiangtian Xu
(74) *Attorney, Agent, or Firm* — Zhu Lehnhoff LLP

(57) ABSTRACT

The preparation method of the high-efficiency gel of the present invention adopts directional freezing technology and carnauba wax assisted normal pressure drying aerogel, and the aerogel has lower density, uniform and stable porous structure and better mechanical strength. The photothermal evaporation system composed of the hydrogel of the present invention has remarkable photothermal purification ability in brine and dye wastewater, and has broad application prospects in seawater desalination, sewage treatment and other fields.

20 Claims, 3 Drawing Sheets

PREPARATION METHOD OF HIGH-EFFICIENCY GEL FOR SEAWATER DESALINATION

REFERENCE TO RELATED APPLICATIONS

The present application claims the priority of Chinese patent application No. 202211436402.7, filed on Nov. 16, 2022, the entire disclose of which is incorporated herein by reference.

TECHNICAL FIELD

The present invention relates to technical field of light-to-heat conversion, in particular to a preparation method of a high-efficiency gel for seawater desalination, especially to a preparation method of high-efficiency gel for seawater desalination that adopts wax modification and low enthalpy of evaporation.

BACKGROUND

Fresh water is one of the most important daily necessities for human survival and industrial production. However, due to the limited fresh water resources on the earth, coupled with the very uneven distribution of fresh water on land, there is a serious fresh water shortage problem in some areas. To solve this problem, obtaining clean fresh water from seawater and sewage is considered as a feasible solution to alleviate the fresh water shortage problem.

At present, solar steam power generation has proven to be a promising technology, which can extract fresh water from seawater or sewage by converting solar energy into heat of water evaporation. To improve solar thermal efficiency, a variety of photothermal evaporators have been widely used, including metallic materials, carbon-based materials, and organic polymers. Meanwhile, these photothermal materials have been fabricated as thermally localized absorbers for efficient light harvesting for interfacial solar vapor generation. However, due to the high evaporation enthalpy of the existing photothermal evaporators, even though the photothermal conversion efficiency is high, the evaporation efficiency is still very low.

SUMMARY

In order to solve the above technical problems, the present invention provides a preparation method of high-efficiency gel, which can be used for seawater desalination. The preparation method comprises the following steps:

- Step 1, prepare dopamine aqueous solution, agar aqueous solution, and carnauba wax solution;
- Step 2, heat the agar aqueous solution prepared in step 1, then pour it into a mold and cool it down to room temperature to form a gel, age the gel, then freeze the aged gel in liquid nitrogen, and then thaw;
- Step 3, soak the thawed gel prepared in step 2 in the dopamine aqueous solution for 24 hours, and in-situ polymerize dopamine on the surface of the gel to generate a light-to-heat conversion material polydopamine;
- Step 4, soak the gel obtained in step 3 in an ethanol solution to change liquid;
- Step 5, soak the gel obtained in step 4 in the carnauba wax solution, and then dry it under normal pressure to obtain photothermal aerogel.

Further, in step 1, add 1-5g agar powder to 100 mL deionized water to prepare the agar aqueous solution.

Further, in step 1, add 2-10 mg/ml dopamine hydrochloride solution to 0.2-1 wt % ammonia solution to prepare the dopamine aqueous solution.

Further, in step 1, add 0.1-0.5g carnauba to 100 mL limonene to prepare the carnauba wax solution.

Further, in step 2, the heating adopts a magnetic stirring heating method, and temperature is heated to 100° C.

Further, in step 2, the mold is a polystyrene mold, and place the gel at 4° C. for 24 hours to age the gel, then freeze it in liquid nitrogen for 3-6 hours, and then place the gel frozen in liquid nitrogen in-Freeze at 18° C. for 12 hours to prevent cracking due to excessive temperature difference, and then thaw at room temperature.

Further, in step 4, place the gel in the ethanol for 12 hours to change the liquid, and during the liquid change period, use capillary force of the dry paper towel to assist the liquid change, and repeat the liquid change for 2-3 times.

Further, the preparation method further includes step 6, clean the photothermal aerogel obtained in step 5 with a mixed solution of ethanol and limonene, and then dry the cleaned photothermal aerogel under normal pressure to obtain the photothermal aerogel with better morphology and pores.

Further, in step 6 and step 6, dry at normal pressure for 24 hours to obtain the photothermal aerogel.

Further, the method further includes step 7, before use, soak the photothermal aerogel obtained in step 5 or step 6 in water for 24 hours to obtain the desired low evaporation enthalpy photothermal hydrogel.

The present invention further provides a wax-modified low evaporation enthalpy and high-efficiency seawater desalination hydrogel material prepared by the preparation method of the present invention.

The present application has the following beneficial effect: compared with the existing technology, the hydrogel photothermal material of the present invention has outstanding photoevaporation rate and efficiency, and the preparation process is simple. Under standard sunlight, the light-to-heat conversion efficiency of the wax-modified low evaporation enthalpy and high-efficiency seawater desalination hydrogel material is as high as 92.27%, and the water evaporation rate reaches 3.28 kg $m^{-2}h^{-1}$. Compared with the existing photothermal conversion materials, the water evaporation rate is greatly improved. The photothermal evaporation system composed of the hydrogel of the present invention has remarkable photothermal purification ability in brine/seawater and dye wastewater, and has broad application prospects in seawater desalination, sewage treatment and other fields. At the same time, the preparation method of the present invention adopts directional freezing technology and carnauba wax to assist normal pressure drying of the aerogel, and the aerogel has a lower density, a uniform and stable porous structure and better mechanical strength. The agar used in the method has a wide range of sources, green degradability and good templating properties, so that the agar aerogel can be used as materials such as heat insulation, adsorption and catalyst carrier. The preparation process of the method is simple and pollution-free, the reagents used are safe and non-toxic, the raw materials are environmentally friendly and cheap, and are more suitable for large-scale production.

DESCRIPTION OF DRAWINGS

In order to illustrate the technical solution of the present invention more clearly, the accompanying drawings that need to be used in the description of the embodiments or the prior art will be briefly introduced below, and obviously, the accompanying drawings in the above description are only some embodiments of the present invention. For those skilled in the art can also obtain other drawings based on these drawings without creative effort.

DETAILED EMBODIMENTS

Below in conjunction with accompanying drawing in the embodiment of the present invention, the technical solution in the embodiment of the present invention is clearly and completely described. Obviously, described embodiment is only a part of embodiments of the present invention, rather than whole implementation example. Based on the embodiments of the present invention, all other embodiments obtained by persons of ordinary skill in the art without making creative efforts will fall within the protection scope of the present invention.

Figure 1:
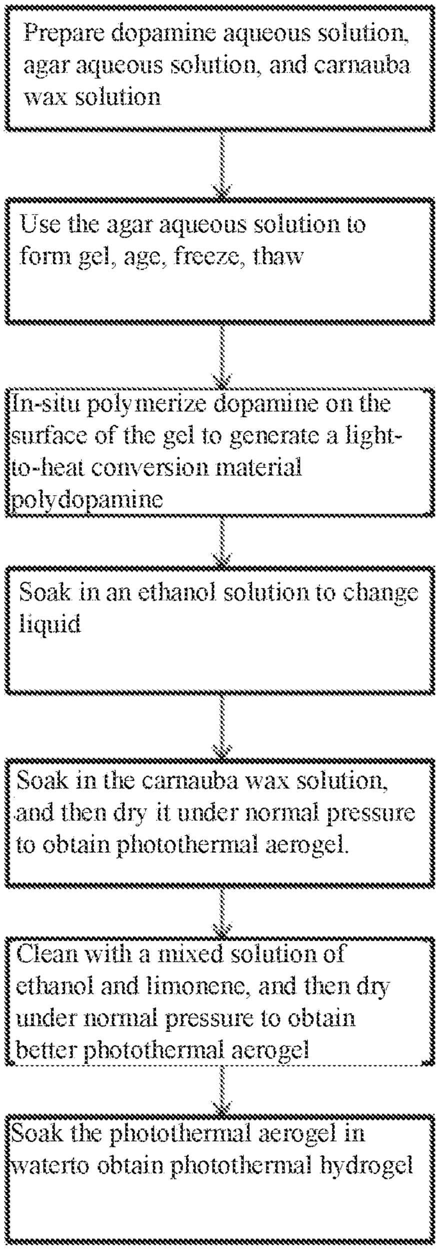
FIG. 1 is a flow chart of the preparation method in the embodiment of the present invention.

In order to solve this technical problem, as shown in FIG. 1, the present invention provides a preparation method of high-efficiency gel, which can be used for seawater desalination, and the preparation method includes the following steps:

Step 1, add 1-5g agar powder to 100 mL deionized water to prepare the agar aqueous solution; add 2-10 mg/ml dopamine hydrochloride solution to 0.2-1wt % ammonia solution to prepare the dopamine solution; add 0.1-0.5g carnauba to 100ml limonene to prepare the carnauba wax solution.

Step 2, adopt a magnetic stirring heating method to heat the agar aqueous solution prepared in step 1 to 100° C. and last for 1min; then cool the agar aqueous solution to 50° C. and pour it into a polystyrene mold to cool it down to room temperature to form a gel, and place the gel in a refrigerated environment at 4° C. for 24 hours to age the gel, then freezing it in liquid nitrogen for 3-6 hours, and then place the gel at −18° C. for 12 hours to prevent cracking due to excessive temperature difference, and then thaw at room temperature.

Step 3, soak the thawed gel prepared in step 2 in the dopamine aqueous solution for 24 hours, and in-situ polymerize dopamine on the surface of the gel to generate a light-to-heat conversion material polydopamine;

Step 4, soak the gel product obtained in step 3 in ethanol solution for 12 hours to change the liquid, and during the liquid change period, use the capillary force of the dry paper towel to assist the liquid change, and repeat the liquid change 2-3 times;

Step 5, soak the gel product obtained in step 4 in the carnauba wax solution for 6 hours, and then dry it under normal pressure for 24 hours to obtain photothermal aerogel;

Step 6: clean the photothermal aerogel obtained in step 5 with a mixed solution of ethanol and limonene, and then dry the cleaned photothermal aerogel under normal pressure to obtain a photothermal aerogel with better morphology and pores.

Step 7, 1 before use, soak the photothermal aerogel obtained in step 5 or step 6 in water for 24 hours to obtain the desired low evaporation enthalpy photothermal aeroge.

Example 1

The present invention proposes a kind of preparation method of efficient gel, and it can be used for seawater desalination, and the preparation method comprises the following steps:

Step 1, add 3g agar powder to 100 mL deionized water to prepare the agar aqueous solution; add 2 mg/ml dopamine hydrochloride solution to 0.2 wt % ammonia solution to prepare the dopamine solution; add 0.25g carnauba to 100 mL limonene to prepare the carnauba wax solution;

Step 2, adopt a magnetic stirring heating method to heat the agar aqueous solution prepared in step 1 to 100° C. and last for 1-5 min; then cool the agar aqueous solution to 50° C. and pour it into a polystyrene mold to cool it down to room temperature to form a gel, and place the gel in a refrigerated environment at 4° C. for 24 hours to age the gel, then freeze it in liquid nitrogen for 6 hours, and then place the gel at −18° C. for 12 hours to prevent cracking due to excessive temperature difference, and then thaw at room temperature;

Step 3, soak the thawed gel prepared in step 2 in the dopamine aqueous solution for 24 hours, and in-situ polymerize dopamine on the surface of the gel to generate a light-to-heat conversion material polydopamine;

Step 4, soak the gel product obtained in step 3 in ethanol solution for 12 hours to change the liquid, and during the liquid change period, use the capillary force of the dry paper towel to assist the liquid change, and repeat the liquid change 2-3 times, and the resulting product is here labeled PDA-A3-xy;

Step 5, soak the gel product obtained in step 4 in the carnauba wax solution, and then dry it under normal pressure for 24 hours to obtain photothermal aerogel;

Step 6: clean the photothermal aerogel obtained in step 5 with a mixed solution of ethanol and limonene, and then drying the cleaned photothermal aerogel under normal pressure to obtain a photothermal aerogel with better morphology and pores;

Step 7, before use, soak the photothermal aerogel obtained in step 5 or step 6 in water for 24 hours to obtain the desired low evaporation enthalpy photothermal aerogel.

Wherein, the low vaporization enthalpy photothermal hydrogel obtained by soaking the aerogel obtained in step 5 in water for 24 hours is marked as PDA-A3-xy0.25%. However, if the aerogel obtained in step 5 is soaked in seawater for 24 hours, the low evaporation enthalpy photothermal hydrogel is marked as PDA-A3-xy0.25% seawater.

Example 2

The present invention proposes a kind of preparation method of efficient gel, and it can be used for seawater desalination, and the preparation method comprises the following steps:

Step 1, add 5g agar powder to 100 mL deionized water to prepare the agar aqueous solution; add 2 mg/ml dopamine hydrochloride solution to 0.2 wt % ammonia solution to prepare the dopamine solution; add 0.5g carnauba to 100 mL limonene to prepare the carnauba wax solution;

Step 2, adopt a magnetic stirring heating method to heat the agar aqueous solution prepared in step 1 to 100° C. and last for 1min; then cool the agar aqueous solution to 50° C. and pour it into a polystyrene mold to cool it down to room temperature to form a gel, and place the gel in a refrigerated environment at 4° C. for 24 hours to age the gel, then freeze it in liquid nitrogen for 6 hours, and then place the gel at −18° C. for 12 hours to prevent cracking due to excessive temperature difference, and then thaw at room temperature;

Step 3, soak the thawed gel prepared in step 2 in the dopamine aqueous solution for 24 hours, and in-situ polymerize dopamine on the surface of the gel to generate a light-to-heat conversion material polydopamine;

Step 4, soak the gel product obtained in step 3 in ethanol solution for 12 hours to change the liquid, and during the liquid change period, use the capillary force of the dry paper towel to assist the liquid change, and repeat the liquid change for 2-3 times;

Step 5, soak the gel product obtained in step 4 in the carnauba wax solution for 6 hours, and then dry it under normal pressure for 24 hours to obtain photothermal aerogel;

Step 6: clean the photothermal aerogel obtained in step 5 with a mixed solution of ethanol and limonene, and then dry the cleaned photothermal aerogel under normal pressure to obtain a photothermal aerogel with better morphology and pores;

Step 7, before use, soak the photothermal aerogel obtained in step 5 or step 6 in water for 24 hours to obtain the desired low evaporation enthalpy photothermal hydrogel.

Wherein, the low vaporization enthalpy photothermal hydrogel obtained by soaking the aerogel obtained in step 5 in water for 24 hours is marked as PDA-A3-xy0.25%.

For the high-efficiency gel obtained by the preparation method of the embodiment of the present application, it has a high light-to-heat conversion effect.

Figure 2:
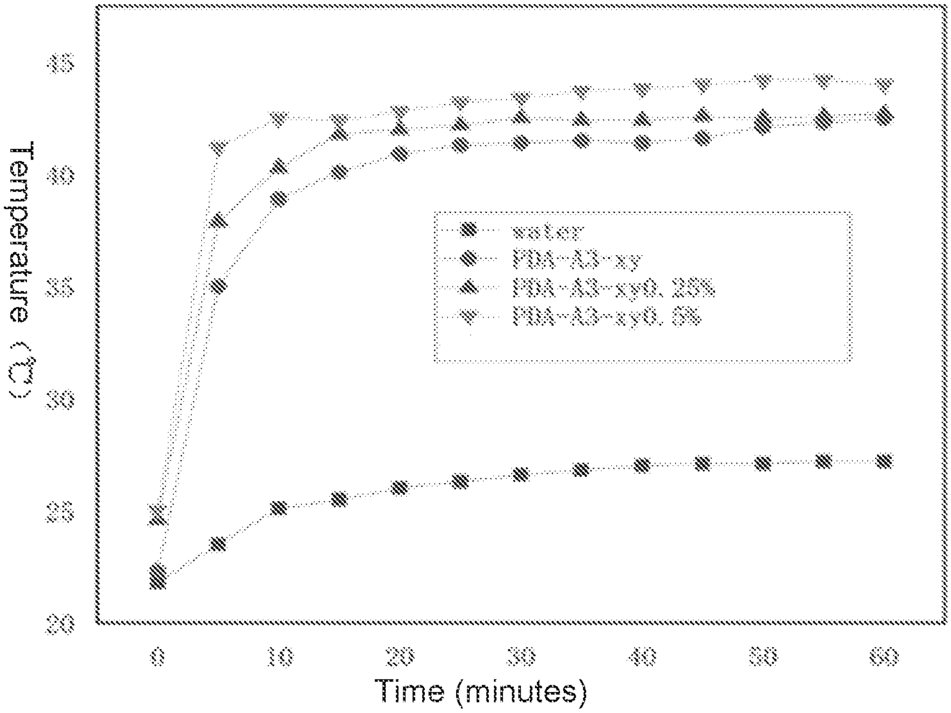
FIG. 2 is a schematic diagram of the surface temperature change of the photothermal gel under a sunlight illumination intensity in an embodiment of the present invention.

FIG. 2 shows the temperature change trend of water and photothermal gel PDA-A3-xy, PDA-A3-xy0.25%, PDA-A3-xy0.5% under solar irradiation, wherein, it can be clearly seen that the use of the photothermal gel of the present application can greatly improve the photothermal conversion efficiency of solar radiation, so that the water body can absorb more solar energy to increase the temperature of the water body. Moreover, the gel soaked with a higher concentration of carnauba wax solution has better photothermal conversion efficiency, so that more solar energy can be absorbed and the temperature of the water body is higher.

Figure 3:
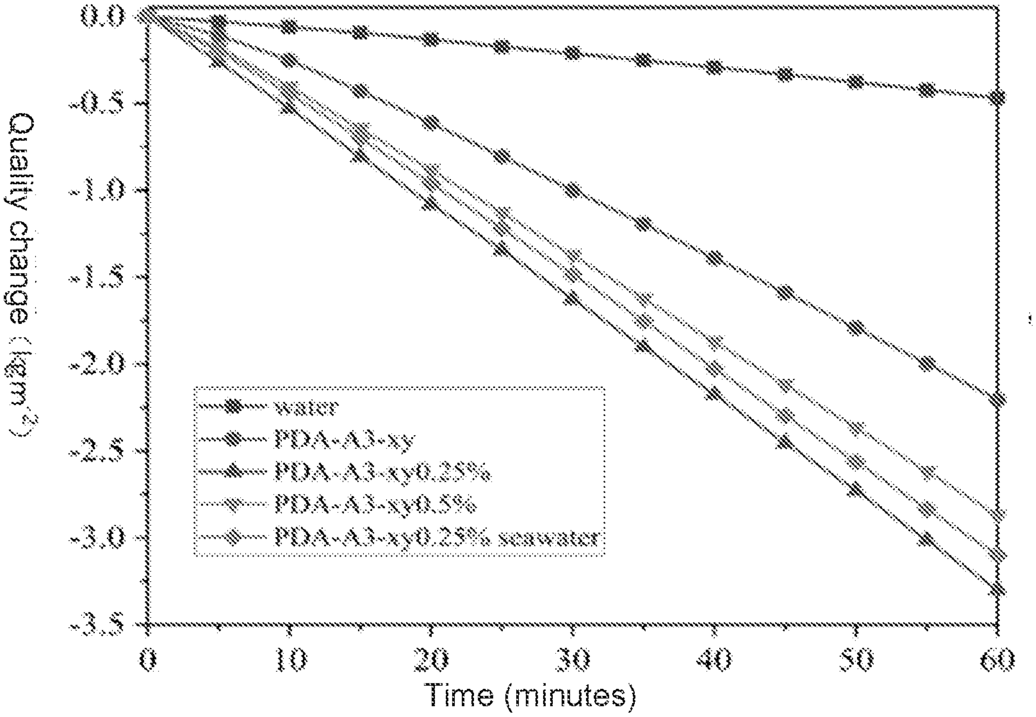
FIG. 3 is a mass change schematic diagram after adopting the photothermal gel in the embodiment of the present invention.
Figure 4:
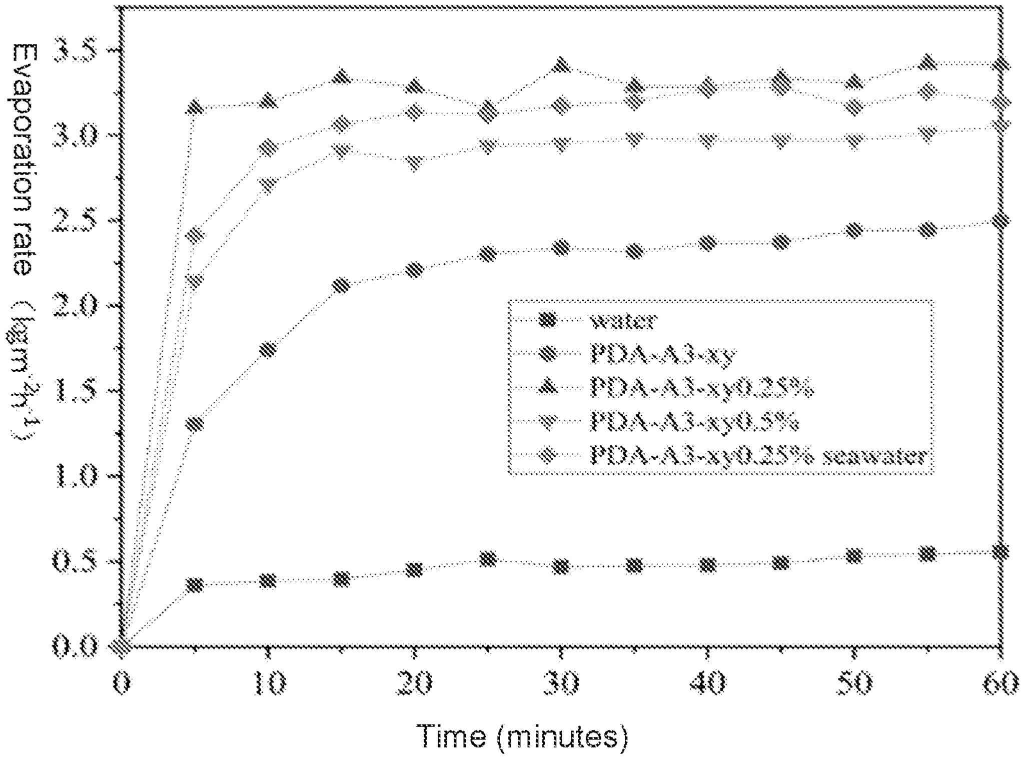
FIG. 4 is a schematic diagram of the evaporation rate of the photothermal gel in the embodiment of the present invention.

FIG. 3 shows the water mass change of water and photothermal gel PDA-A3-xy, PDA-A3-xy0.25%, PDA-A3-xy0.5%, PDA-A3-xy0.25% seawater under sunlight trend, and FIG. 4 shows the evaporation rate trend of water and photothermal gel PDA-A3-xy, PDA-A3-xy0.25%, PDA-A3-xy0.5%, PDA-A3-xy0.25% seawater under solar irradiation. It can be clearly seen from FIG. 3 and FIG. 4 that the photothermal gel obtained by the preparation method of the present application can greatly increase the evaporation rate of the water body, and greatly accelerate the speed and efficiency of seawater desalination. Under standard sunlight irradiation, the photothermal conversion efficiency of the wax-modified low evaporation enthalpy and high-efficiency seawater desalination hydrogel material is as high as 92.27%, and the water evaporation rate reaches 3.28 kg $m^{-2}h^{311}$, compared with the existing photothermal conversion material, the water evaporation rate is greatly improved.

The present invention further provides a wax-modified low evaporation enthalpy and high-efficiency seawater desalination hydrogel material prepared by the preparation method of the present invention.

The present application has the following beneficial effect: compared with the existing technology, the hydrogel photothermal material of the present invention has outstanding photoevaporation rate and efficiency, and the preparation process is simple. Under standard sunlight, the light-to-heat conversion efficiency of the wax-modified low evaporation enthalpy and high-efficiency seawater desalination hydrogel material is as high as 92.27%, and the water evaporation rate reaches 3.28 kg $m^{-2}h^{-1}$. Compared with the existing photothermal conversion materials, the water evaporation rate is greatly improved. The photothermal evaporation system composed of the hydrogel of the present invention has remarkable photothermal purification ability in brine and dye wastewater, and has broad application prospects in seawater desalination, sewage treatment and other fields. At the same time, the preparation method of the present invention adopts directional freezing technology and carnauba wax to assist normal pressure drying of the aerogel, and the aerogel has a lower density, a uniform and stable porous structure and better mechanical strength. The agar used in the method has a wide range of sources, green degradability and good templating properties, so that the agar aerogel can be used as materials such as heat insulation, adsorption and catalyst carrier. The preparation process of the method is simple and pollution-free, the reagents used are safe and non-toxic, the raw materials are environmentally friendly and cheap, and are more suitable for large-scale production.

The above disclosures are only a few preferred embodiments of the present invention, which certainly cannot be used to limit the scope of the present invention. Therefore, equivalent changes made according to the claims of the present invention still fall within the scope of the present invention.

The invention claimed is:

1. A preparation method of a gel, comprising:

Step 1, add 2-10 mg/ml dopamine hydrochloride solution to 0.2-1 wt % ammonia solution to prepare dopamine aqueous solution, and add 0.1-0.5 g carnauba to 100 ml limonene to prepare carnauba wax solution, and prepare agar aqueous solution;

Step 2, heat the agar aqueous solution prepared in step 1, then pour it into a polystyrene mold and cool it down to room temperature to form a gel, place the gel at 4° C. for 24 hours to age the gel, then freeze it in liquid nitrogen for 3-6 hours, and then place the gel at −18° C. for 12 hours to prevent cracking due to excessive temperature difference, and then thaw at room temperature;

Step 3, soak the thawed gel prepared in step 2 in the dopamine aqueous solution for 24hours, and in-situ polymerize dopamine on the surface of the gel to generate a light-to-heat conversion material polydopamine;

Step 4, soak the gel obtained in step 3 in an ethanol solution to change liquid;

Step 5, soak the gel obtained in step 4 in the carnauba wax solution, and then dry it under normal pressure to obtain photothermal aerogel.

2. The preparation method of claim 1, wherein in step 1, add 1-5 g agar powder to 100 mL deionized water to prepare the agar aqueous solution.

3. The preparation method of claim 1, wherein in step 2, the heating adopts a magnetic stirring heating method, and temperature is heated to 100° C.

4. The preparation method of claim 1, wherein in step 4, place the gel in the ethanol solution for 12 hours to change the liquid, and during the liquid change period, use capillary force of a dry paper towel to assist the liquid change, and repeat the liquid change for 2-3 times.

5. The preparation method of claim 1, wherein the preparation method further includes step 6, clean the photothermal aerogel obtained in step 5 with a mixed solution of ethanol and limonene, and then dry the cleaned photothermal aerogel under normal pressure to obtain the photothermal aerogel.

6. The preparation method of claim 2, wherein the preparation method further includes step 6, clean the photothermal aerogel obtained in step 5 with a mixed solution of ethanol and limonene, and then dry the cleaned photothermal aerogel under normal pressure to obtain the photothermal aerogel.

7. The preparation method of claim 3, wherein the preparation method further includes step 6, clean the photothermal aerogel obtained in step 5 with a mixed solution of ethanol and limonene, and then dry the cleaned photothermal aerogel under normal pressure to obtain the photothermal aerogel.

8. The preparation method of claim 4, wherein the preparation method further includes step 6, clean the photothermal aerogel obtained in step 5 with a mixed solution of ethanol and limonene, and then dry the cleaned photothermal aerogel under normal pressure to obtain the photothermal aerogel.

9. The preparation method of claim 5, wherein the preparation method further includes step 6, clean the photothermal aerogel obtained in step 5 with a mixed solution of ethanol and limonene, and then dry the cleaned photothermal aerogel under normal pressure to obtain the photothermal aerogel.

10. The preparation method of claim 5, wherein in step 6 and step 6, at dry at normal pressure for 24 hours to obtain the photothermal aerogel.

11. The preparation method of claim 6, wherein in step 6 and step 6, at dry at normal pressure for 24 hours to obtain the photothermal aerogel.

12. The preparation method of claim 7, wherein in step 6 and step 6, at dry at normal pressure for 24 hours to obtain the photothermal aerogel.

13. The preparation method of claim 8, wherein in step 6 and step 6, at dry at normal pressure for 24 hours to obtain the photothermal aerogel.

14. The preparation method of claim 9, wherein in step 6 and step 6, at dry at normal pressure for 24 hours to obtain the photothermal aerogel.

15. The preparation method of claim 5, wherein further includes step 7, before use, soak the photothermal aerogel obtained in step 5 or step 6 in water for 24 hours to obtain a photothermal hydrogel.

16. The preparation method of claim 6, wherein further includes step 7, before use, soak the photothermal aerogel obtained in step 5 or step 6 in water for 24 hours to obtain a photothermal hydrogel.

17. The preparation method of claim 7, wherein further includes step 7, before use, soak the photothermal aerogel obtained in step 5 or step 6 in water for 24 hours to obtain a photothermal hydrogel.

18. The preparation method of claim 8, wherein further includes step 7, before use, soak the photothermal aerogel obtained in step 5 or step 6 in water for 24 hours to obtain a photothermal hydrogel.

19. The preparation method of claim 9, wherein further includes step 7, before use, soak the photothermal aerogel obtained in step 5 or step 6 in water for 24 hours to obtain a photothermal hydrogel.

20. The preparation method of claim 10, wherein further includes step 7, before use, soak the photothermal aerogel obtained in step 5 or step 6 in water for 24 hours to obtain a photothermal hydrogel.

* * * * *